United States Patent
Wilson et al.

(10) Patent No.: US 11,518,569 B2
(45) Date of Patent: Dec. 6, 2022

(54) LIGHTWEIGHT POLYMER BOTTLE FOR WINE AND SPIRITS

(71) Applicant: Verre Vert, Inc., Greenwich, CT (US)

(72) Inventors: Brandon Wilson, Atherton, CA (US);
Dylan Robbins, Greenwich, CT (US);
Morgan Wiley, Palo Alto, CA (US);
Dustin Wilson, New York, NY (US)

(73) Assignee: Verre Vert, Inc., Greenwich, CT (US)

( * ) Notice: Subject to any disclaimer, the term of this patent is extended or adjusted under 35 U.S.C. 154(b) by 102 days.

(21) Appl. No.: 17/247,476

(22) Filed: Dec. 11, 2020

(65) Prior Publication Data

US 2022/0033128 A1    Feb. 3, 2022

Related U.S. Application Data

(63) Continuation of application No. 16/947,363, filed on Jul. 29, 2020, now Pat. No. 10,894,625.

(51) Int. Cl.
*B65D 1/02*    (2006.01)
*B65D 23/08*    (2006.01)
*B65D 23/02*    (2006.01)

(52) U.S. Cl.
CPC .......... *B65D 1/0215* (2013.01); *B65D 23/02* (2013.01); *B65D 23/0821* (2013.01)

(58) Field of Classification Search
CPC .. B65D 1/0215; B65D 23/02; B65D 23/0821; B65D 39/0011; B65D 39/0058; B65D 81/3837; B65D 5/56; B65D 2577/00; C08J 7/0427; C08J 7/048; C08J 7/06; C08J 7/065; A61K 51/1289; G01N 2033/0081
See application file for complete search history.

(56) References Cited

U.S. PATENT DOCUMENTS

| | | | |
|---|---|---|---|
| 3,093,507 A | 6/1963 | Lander et al. | |
| 3,282,729 A | 11/1966 | Richardson et al. | |
| 3,415,402 A * | 12/1968 | Webber | B65D 17/00 220/62.12 |
| 4,282,279 A * | 8/1981 | Strickland | B65D 25/34 206/139 |

(Continued)

FOREIGN PATENT DOCUMENTS

| BR | 8907337 A | 5/1991 |
|---|---|---|
| CA | 3015446 A1 | 11/2017 |

(Continued)

OTHER PUBLICATIONS

Database WPI Week 200159, Thomson Scientific, London, GB, 2017 Clarivate Analytics, 1 pg.

(Continued)

*Primary Examiner* — Kareen K Thomas
(74) *Attorney, Agent, or Firm* — Ascenda Law Group, PC

(57) ABSTRACT

A container for alcohol, e.g., a wine bottle, formed of a polycarbonate wall sandwiched between exterior and interior coatings, at least one of which may be an epoxy of 4,4'-isopropylidenedicyclohexanol and 1-chloro-2,3,-epoxypropane, crosslinked with 3-aminopropyltriethoxysilane. The polycarbonate wall may be an extrusion blow molded monolithic form at least 1.5 mm thick, and either or both of the exterior coating and the interior coating may have a thickness between 1 nm and 100 μm, inclusive.

15 Claims, 1 Drawing Sheet

(56) References Cited

U.S. PATENT DOCUMENTS

| | | | |
|---|---|---|---|
| 4,393,106 A | | 7/1983 | Maruhashi et al. |
| 4,482,586 A | * | 11/1984 | Smith .................... B32B 27/36 |
| | | | 428/480 |
| 4,564,541 A | | 1/1986 | Taira et al. |
| 4,699,809 A | | 10/1987 | Maruhashi et al. |
| 4,792,488 A | * | 12/1988 | Schirmer .............. B32B 27/304 |
| | | | 428/518 |
| 4,801,078 A | * | 1/1989 | Carlsson ................ B65D 5/062 |
| | | | 229/123.2 |
| 4,811,849 A | * | 3/1989 | Rausing ................. B65D 5/068 |
| | | | 229/125.42 |
| 4,816,304 A | * | 3/1989 | Nohara ................... B32B 27/08 |
| | | | 264/514 |
| 4,818,575 A | * | 4/1989 | Hirata ..................... B29C 49/22 |
| | | | 215/381 |
| 4,980,211 A | * | 12/1990 | Kushida ................. B32B 27/08 |
| | | | 426/127 |
| 5,021,515 A | | 6/1991 | Cochran et al. |
| 5,084,356 A | * | 1/1992 | Deak ....................... B32B 38/00 |
| | | | 428/458 |
| 5,085,821 A | * | 2/1992 | Nohara ................ B65D 1/0215 |
| | | | 264/296 |
| 5,122,410 A | * | 6/1992 | Lofgren .................. B32B 9/045 |
| | | | 426/127 |
| 5,300,541 A | | 4/1994 | Nugent, Jr. et al. |
| 5,637,365 A | | 6/1997 | Carlblom |
| 5,688,598 A | | 11/1997 | Keck et al. |
| 5,750,226 A | | 5/1998 | Macauley et al. |
| 5,800,880 A | | 9/1998 | Laurent |
| 5,853,830 A | | 12/1998 | Mccaulley et al. |
| 5,858,543 A | | 1/1999 | Futter et al. |
| 6,013,128 A | | 1/2000 | Hubbard et al. |
| 6,082,563 A | | 7/2000 | Kohn et al. |
| 6,368,686 B1 | * | 4/2002 | Lofgren .................. B32B 27/16 |
| | | | 428/452 |
| 6,489,386 B1 | | 12/2002 | Plotzker et al. |
| 6,499,311 B2 | | 12/2002 | Mahajan |
| 6,641,774 B2 | | 11/2003 | Slat et al. |
| 6,676,883 B2 | | 1/2004 | Hutchinson et al. |
| 6,939,591 B2 | | 9/2005 | Hutchinson et al. |
| 7,214,415 B2 | | 5/2007 | Tibbitt et al. |
| 7,727,605 B2 | | 6/2010 | Darr et al. |
| 8,377,530 B2 | | 2/2013 | Peters et al. |
| 2003/0031885 A1 | | 2/2003 | Shiau et al. |
| 2003/0087030 A1 | | 5/2003 | Hama et al. |
| 2003/0203143 A1 | | 10/2003 | Nagashima |
| 2003/0235667 A1 | | 12/2003 | Darr et al. |
| 2005/0147776 A1 | | 7/2005 | Cheng |
| 2006/0099362 A1 | | 5/2006 | Farha |
| 2008/0011706 A1 | | 1/2008 | Downing et al. |
| 2009/0220717 A1 | | 9/2009 | Wilczak et al. |
| 2009/0270555 A1 | | 10/2009 | Satoh et al. |
| 2009/0280268 A1 | | 11/2009 | Glukhoy et al. |
| 2009/0284421 A1 | * | 11/2009 | Glukhoy .................. H01Q 1/26 |
| | | | 343/701 |
| 2010/0012617 A1 | | 1/2010 | Ulibarri et al. |
| 2011/0120936 A1 | | 5/2011 | Escobar et al. |
| 2013/0071649 A1 | | 3/2013 | Hanger et al. |
| 2013/0323423 A1 | | 12/2013 | Nakaya et al. |
| 2014/0130693 A1 | | 5/2014 | Sugasaki |
| 2015/0203222 A1 | | 7/2015 | Zonato |
| 2016/0185498 A1 | | 6/2016 | Henderson |
| 2016/0186309 A1 | | 6/2016 | Henderson |
| 2019/0161855 A1 | | 5/2019 | Kytzia et al. |

FOREIGN PATENT DOCUMENTS

| | | |
|---|---|---|
| EP | 0051443 B1 | 1/1986 |
| EP | 1847507 A1 | 10/2007 |
| EP | 3715500 A1 | 9/2020 |
| GB | 2207439 B | 2/1992 |
| JP | H03275327 A | 12/1991 |
| JP | 2001163370 A | 6/2001 |
| JP | 2018-150076 A | 9/2018 |
| KR | 20070078849 A | 8/2007 |
| WO | 1998/012127 A1 | 3/1998 |
| WO | 2002049923 A2 | 6/2002 |
| WO | 03/014412 A1 | 2/2003 |
| WO | 2006052659 A2 | 5/2006 |
| WO | 2011140473 A1 | 11/2011 |
| WO | 2017036866 A1 | 3/2017 |

OTHER PUBLICATIONS

International Search Report and Written Opinion dated May 4, 2021, from ISA/European Patent Office, for International Patent Application No. PCT/US2020/064936 (filed Dec. 14, 2020), 18 pgs.

Amcor Rigid Plastics, "Lightweights for the American Wine Industry," Jan. 13, 2012, 4 pgs.

Amcor Rigid Plastics, "Bronco Wine Co. Introduces 750ml PET Bottles for Its Leading Wine Brands," Oct. 18, 2015, downloaded from: https://www.amcor.com/media/news/b/bronco-wine-co-introduces-750ml-pet-bottles-for-its-leading-wine-brands, 9 pgs.

Paben, Jared, "Company unveils RPET bottle with recycling-friendly barrier coating," Plastics Recycling Update, Oct. 31, 2019, downloaded from: https://resource-recycling.com/plastics/2019/10/31/company-unveils-rpet-bottle-with-recycling-friendly-barrier-coating/, 4 pgs.

* cited by examiner

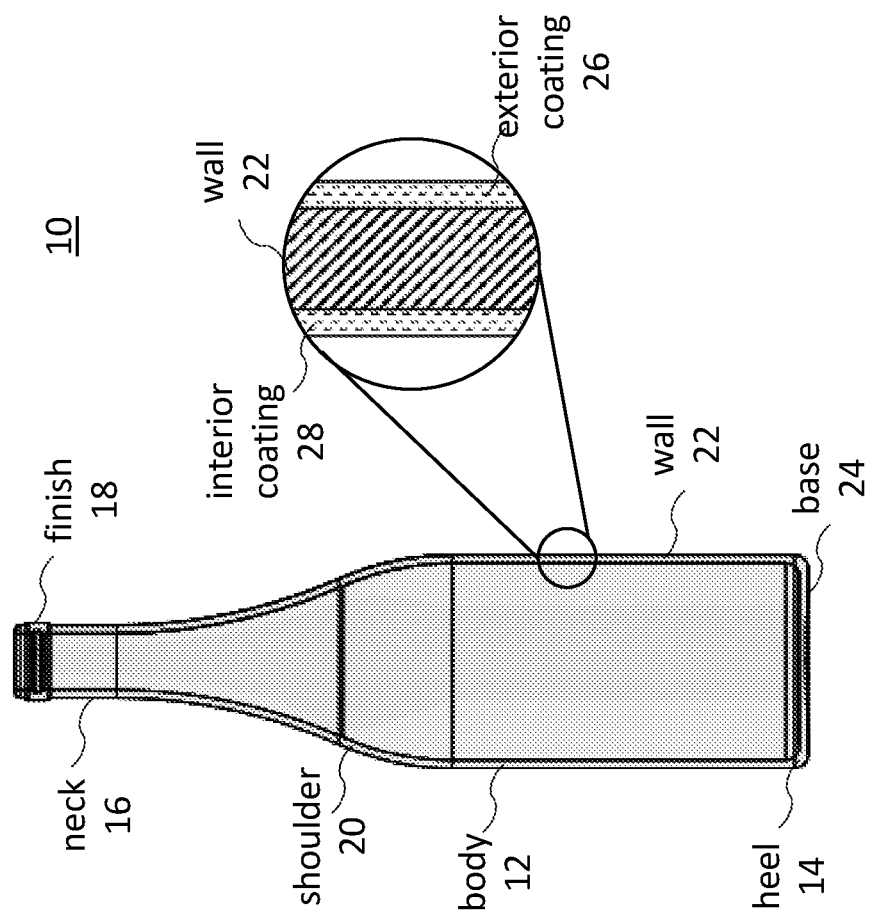

LIGHTWEIGHT POLYMER BOTTLE FOR WINE AND SPIRITS

RELATED APPLICATIONS

This is a CONTINUATION of U.S. application Ser. No. 16/947,363, filed Jul. 29, 2020, incorporated herein by reference.

FIELD OF THE INVENTION

The present invention relates to packaging for alcoholic beverages, such as wine and spirits, and in particular to bottles that are fabricated from lightweight polymers and coated so as to prevent the ingress of oxygen and the egress of volatile, aromatic compounds.

BACKGROUND

Packaging for premium alcoholic beverages, such as wine and spirits, traditionally comes in the form of glass bottles that are chemical compatible with alcohol and other volatile organic compounds (VOCs), and which have aesthetic appeal to consumers. Glass has long been trusted for such applications, in part because of its chemical compatibility, low oxygen transfer, and overall suitability for long term storage. However, the weight and fragility of glass bottles makes them imperfect containers for these uses.

Polymeric alternatives to glass bottles have been developed. For example, wine bottles made from polyethylene terephthalate (PET) are known and offer some advantages (in terms of weight and resistance to breakage) over traditional glass bottles. EP1847507 B 1, for example, describes a lightweight wine bottle fabricated of PET.

However, PET, and most polymers in fact, exhibit relatively high gas permeability as compared to glass, resulting in the undesired ingress of oxygen to and the undesired egress of volatile and aromatic compounds from bottles made of such compounds. This can lead to unwanted oxidation reactions and the production of undesired flavor compounds in premium alcoholic beverage. Indeed, excess levels of oxygen can quickly cause the deterioration of premium alcoholic beverages, in particular wine. Consequently, polymeric bottles commercialized to date, particularly those made out of stretch blow molded PET, have limited shelf lives due to oxygen transfer. Moreover, many premium alcoholic beverages, such as wine and whiskey, distinguish themselves by the content and relative amounts of specific aromatic compounds that give rise to distinctive flavors and smells. The high rates of egress of VOCs through polymers can substantially change the compositions of these compounds. Since wines and whiskeys are often aged for decades, limiting the transfer of oxygen into and of VOCs out of the packaging material is paramount. Some polymers also exhibit limited chemical stability when faced with the high alcohol and acid content of many alcohol beverages.

Furthermore, currently available plastic bottles do not have the same commercial appeal and market acceptance in the premium alcoholic beverage market. Unlike glass bottles, stretch blow molded PET bottles can be deformed via manual compression similar to that of a plastic water bottle. A universal feature of premium alcoholic beverages is that the packaging is not deformable by manual compression.

SUMMARY OF THE INVENTION

The present inventors have recognized there exists an unmet need for a lightweight, durable, rigid container that has high aesthetic appeal and provides the same aging characteristics as its glass counterpart.

In one embodiment, a wine bottle configured in accordance with the present invention has a body that terminates in a base, a shoulder, and a neck, the shoulder forming a tapered region between the neck and the body, and the neck terminating in a finish. The wine bottle is characterized by the body, base, shoulder, neck, and finish being made of a polycarbonate wall sandwiched between an exterior coating and an interior coating, at least one of which is an epoxy of 4,4'-isopropylidenedicyclohexanol and 1-chloro-2,3,-epoxypropane, crosslinked with 3-aminopropyltriethoxysilane. Either or both of the exterior coating and the interior coating may have a thickness between 1 nm and 100 µm, inclusive, preferably a thickness between 100 nm and 30 µm, inclusive. The polycarbonate wall may be an extrusion blow molded monolithic form, or a form developed by another process. Alternatively, the polycarbonate wall may be formed by a composition of injection molded parts. The wall preferably has a thickness of no less than 1.5 mm.

In another embodiment, a container for alcohol includes a polymer wall sandwiched between a coating applied to an interior and an exterior thereof. The coating may be an epoxy of 4,4'-isopropylidenedicyclohexanol and 1-chloro-2, 3,-epoxypropane, crosslinked with 3-aminopropyltriethoxysilane, or it may be an oxide of silicon, for example, an $SiO_2$-based coating. The polymer wall and its applied coatings may have a total thickness of approximately 1-5 mm, preferably a total thickness of no less than 1.5 mm. Either or both of the coatings to the interior and the exterior of the wall may have a thickness of approximately 1 nm to 100 µm, inclusive, preferably a thickness of approximately 100 nm to 30 µm. In one example, the container is a wine bottle having volume of approximately 0.187 to 3 liters, preferably approximately 750 ml. The wine bottle may have a body that terminates in a base, a shoulder, and a neck, the shoulder forming a tapered region between the neck and the body, and the neck terminating in a finish and may have an overall height of approximately 290.53 mm and an overall width at the body of approximately 89.4 mm. In one particular example, the body is approximately 130.5 mm tall, the neck is approximately 37.23 mm tall, and the shoulder has an inside radius of approximately 101 mm at a junction with the body, and an outside radius of approximately 200 mm tapering towards the neck.

Further embodiments of the invention are described in detail below.

BRIEF DESCRIPTION OF THE DRAWINGS

The present invention is illustrated by way of example, and not limitation, in the FIGURES of the accompanying drawings, in which:

FIG. 1 illustrates an example of a wine bottle having a polycarbonate wall sandwiched between an exterior coating and an interior coating in accordance with an embodiment of the present invention.

DETAILED DESCRIPTION

Described herein are embodiments of packaging for alcoholic beverages, such as wine and spirits. In one embodiment, the packaging is in the form of a bottle fabricated from a lightweight polymer which is coated so as to prevent the ingress of oxygen. Referring to FIG. 1, in one particular embodiment a wine bottle 10 configured in accordance with the invention has a body 12 that terminates in a base 24, a shoulder 20, and a neck 16, the shoulder 20 forming a tapered region between the neck 16 and the body 12, and the neck 16 terminating in a finish 18, wherein some or all of the body 12, base 24 (including a heel 14), shoulder 20, neck 16, and finish 18 are made of a clear, blow molding grade polycarbonate (PC) wall 22 sandwiched between an exterior coating 26 and an interior coating 28, at least one of which is an epoxy of 4,4'-isopropylidenedicyclohexanol and 1-chloro-2,3,-epoxypropane, crosslinked with 3-aminopropyltriethoxysilane. The exterior coating 26, interior coating 28, or both may have a thickness between 1 nm and 100 µm, inclusive, and preferably 100 nm to 30 µm, inclusive. In other embodiments, the present wine bottle may employ other coatings, such as coatings of so-called "liquid glass," a coating made of an oxide of silicon. Other coatings may also be used. In still further embodiments, the present wine bottle may be fashioned from one or more of polysulfone (PSU), polypropylene (PP), polyethylene terephthalate (PET), or glycol-modified polyethylene terephthalate (PETG). Another alternative material for the bottle is the Eastar Copolymer EB062, a copolymer based on PETG that is manufactured by the Eastman Chemical Company and has superior recyclability and chemical/mechanical properties to PET and PETG. Copolymers, blends, and mixtures of the preceding materials may also be used.

The present invention addresses various ones of the issues described above and provides a lightweight bottle for long-term storage of premium alcoholic beverages. The bulk of the bottle is made up of a polymer, e.g. polycarbonate (PC), while the interior of the bottle is coated with a thin (e.g., preferably, between 1 nm and 100 µm thick) film of a passive barrier to (i) limit oxygen transfer into the bottle, (ii) limit the transfer of VOCs out of the bottle, and (iii) provide chemically compatibility with the acidic conditions associated with alcoholic beverages contained in the bottle. The exterior of the bottle may or may not be similarly coated by a thin film of the material of similar thickness. In various embodiments, bottles fabricated in accordance with embodiments of the invention weigh less than 300 grams, or even less than 200 grams (for a 750 ml bottle, as compared to 500 grams for a conventional 750 ml glass wine bottle), are durable such that they can be shipped without insulating packaging material, and are suitable for long term storage of their contents (e.g., for time periods of 30-3650 days). In various embodiments, bottles fashioned in accordance with the present invention may have interior volumes ranging between approximately 0.187 to 3 liters, inclusive, a total wall thickness in the range of approximately 1-5 mm, inclusive, and a total weight of approximately 10-500 grams, preferably approximately 100-250 grams. In one embodiment, the polymer wall thickness varies at different portions of the bottle, for example the neck may have a thickness of approximately 2.5-3 mm and the body may have a thickness of approximately 1.5-2 mm. The varying thicknesses allow the bottle to remain lighter than a conventional glass bottle, while still providing structural support to allow for corking and uncorking via a corkscrew. A preferred bottle has a volume of approximately 750 ml, a wall thickness of no less than approximately 1.5 mm, and a weight of approximately 200-300 grams. PCs are not traditionally used for food or beverage containers because they contain bisphenol A (BPA), however, by coating the PC bottle with the thin passive barrier, harmful BPAs are prevented from entering the liquid contents of the bottle.

The polymer composition of the bottle contributes to its low overall weight. Most polymers have a density less than half that of glass. And since polymers like PC have superior mechanical properties to glass, the wall thickness can be reduced from that of a conventional glass bottle, providing further reduction in overall weight. To retain a high-quality aesthetic, and to provide mechanical support for corking, some embodiments of bottles fashioned in accordance with the present invention use a minimum wall thickness of 1.5 mm. In other embodiments, thinner or thicker minimum wall thickness may be employed. Preferably the bottle is manufactured via extrusion blow molding, however, the present polymeric bottle could be manufactured via a number of other methods including but not limited to, injection blow molding, stretch blow molding, and injection molding. The bottle may be fabricated as a monolithic construction, e.g., by blow molding, or as a cohesive assembly of multiple injection molded pieces.

As discussed above, the interior and, optionally, the exterior of the polymer bottle of the present invention is coated with a thin film. All polymers have higher gas transfer rates than glass. The thin wall thickness of the present polymer bottle compounds this problem. This is problematic for long term storage because oxidation of wine and spirits can generate undesirable aromatic compounds that compromise the quality of the product. In the past, various efforts have been made to introduce oxygen scavengers into the polymeric bulk material from which a bottle is made to limit oxygen transfer. WO 1998/012127 A1 describes one such approach. While effective in the short term, oxygen scavengers have a limited lifetime and will eventually be used up, leaving the product contained in the bottle open to oxidation.

In contrast to these earlier approaches, bottles fashioned in accordance with the present invention utilize a thin film coating to confer compatibility with long term storage. The material used for the coating should be generally impermeable to gas diffusion, oxygen in particular, and volatile compounds in the case of wine. Examples of barrier materials are described in U.S. Pat. No. 5,300,541 (polyamide-polyepoxide coating) and U.S. Pat. No. 5,637,365 (epoxy-amine aryloxy/aryloate coating). There are many such coatings that have been developed commercially, including Bairocaide (available from PPG Industries of Pittsburgh, Pa.), EC-12 (available from Westcoat Specialty Coating Systems of San Diego, Calif.), Nanolok (available from InMat Inc. of Hillsborough Township, N.J.), HydroPhil (available from Lotus Leaf Coatings, Inc. of Albuquerque, N. Mex.), Hydak (available from Biocoat, Inc. of Horsham, Pa.), and NanoSeal nanotechnology coating (available from NanoSeal or Conroe, Tex.). These commercially available coatings vary in their chemical compositions. Coatings manufactured of $SiO_2$ are often used because they are chemically similar to glass. Market research indicates that beverage manufacturers are most trusting of $SiO_2$ coatings, also referred to as "liquid glass coatings," rather than other types of coatings. Liquid glass coatings have been employed in a number of other industries including health care and automotive as a means to protect surfaces from tarnishing or corrosion. A preferred material for bottles configured in accordance with the present invention is an epoxy of 4,4'-isopropylidenedicyclohexanol and 1-chloro-2,3,-epoxypropane, crosslinked with 3-aminopropyltriethoxysilane, available commercially under the designation Hybrid Multi Protect Coating, a two component coating system from Creative Chemical Manufacturers GmbH of Overath, Germany. However, suitable $SiO_2$ materials, such as Art. Nos. 7608 or 7601 from Creative Chemical Manufacturers or Nanoflex® SG 70 from Nano-Care Deutschland AG of Saarwellingen, Germany, may be used provided the coating affords a passive barrier to oxygen diffusion. Preferably the coating should be colorless and nearly imperceptible to the human eye. The coating should be applied at a minimum to the entire interior of the bottle, but in some embodiments of the invention is also applied to the exterior of the bottle. Since coatings can vary in their ability to limit oxygen transfer, applying the coating to both interior and exterior of the bottle can help reduce oxygen transfer. The coating is applied in a thin continuous layer ranging from 100 nm to 30 µm at least to the whole interior of the container, but preferably to the entire polymer surface (e.g., the interior and exterior of the bottle). The coating may be applied in any of many methods, preferably spraying, but dipping or painting could also be used depending on the number of parts that need to be coated.

Bottles fashioned in accordance with the present invention may be transparent (e.g., with an optical transparency within 10% of that of glass) or translucent, and may be one of a number of colors commonly used in the premium alcohol industry, for example deaf leaf green, antique green, champagne green, or flint. At the finish, the bottle's aperture is preferably sized to receive a standard cork, however, in some embodiments a screw top or a metal crown-enclosure, like that of a glass beer bottle, could also be used. For the storage of wine, the design of the polymer bottle is of particular importance. Wine bottles are commonly produced in one of three shapes: Burgundy, Bordeaux, or Riesling. The shape of the bottle is important both for consumer appeal and for maintaining compatibility with existing bottling lines. However, manufacturing processes such as blow molding are incapable of making a punt, the traditional indent in the bottom of a wine bottle. Maintaining traditional bottle dimensions and removing the punt from the design results in a lowering of the fill line. The location of the fill line is important because it defines how much oxygen is in the bottle when it is corked. Removing the punt and keeping the fill line, while maintaining compatibility with existing bottling lines, makes the bottle design for polymer manufacturing non-trivial. Moreover, employing thinner walls than the typical glass bottle further reduces the fill line given fixed outer bottle dimensions.

Japanese patent application publication JP2018-150076 A introduced a bottle fashioned from a polymeric material but with a shape that deviates significantly from the traditional aesthetic in that it is a polygonal prism rather than a cylinder. In contrast, embodiments of the present invention maintain bottles of traditional shapes associated with wines. For example, in one embodiment a bottle configured in accordance with the present invention which is intended for use in connection with Burgundy maintains an appropriately located fill line despite the absence of a punt and the presence thinner walls than those associated with glass wine bottles. The design is reflected in the illustrations shown in FIG. 1 and it will be appreciated that the taper of the bottle begins lower down on the bottle and is, at least initially, shallower than on a typical Burgundy wine bottle. The outer diameter is reduced slightly from a typical Burgundy wine bottle. In one embodiment, the bottle has an overall height of 290.53 mm, and an overall width (at the body) of 89.4 mm. The body is 130.5 mm tall and the neck is 37.23 mm tall. The shoulders have an inside radius of 101 mm at the junction with the body, and an outside radius of 200 mm tapering towards the neck. The foregoing dimensions and the others discussed herein are approximate and, generally, are within a tolerance of +/−3% of the specified dimension.

Thus, packaging for alcoholic beverages, such as wine and spirits, fabricated from a lightweight polymer that is coated so as to prevent the ingress of oxygen and the egress of volatile, aromatic compounds have been described.

What is claimed is:

1. A container for alcohol comprising a polymer wall of the container sandwiched between a coating applied to an interior of said polymer wall of the container and a coating applied to an exterior of said polymer wall of the container, wherein:
    the polymer wall is an extrusion blow molded monolithic form or a form developed by injection molding,
    the coating applied to said interior of said polymer wall, the coating applied to said exterior of said polymer wall, or both has a thickness between 1 nm and 100 µm, inclusive, and
    the polymer wall of the container and the applied interior and exterior coatings have a total thickness of approximately 1-5 mm.

2. The container of claim 1, wherein the applied interior and exterior coatings are an oxide of silicon.

3. The container of claim 2, wherein the applied interior and exterior coatings are an $SiO_2$-based coating.

4. The container of claim 1, wherein the polymer wall of the container and the applied coatings have a total thickness of no less than 1.5 mm.

5. The container of claim 1, wherein at least one of the coating applied to the interior of said polymer wall of the container and the coating applied to the exterior of said polymer wall of the container has a thickness of 1 nm to 100 µm, inclusive.

6. The container of claim 5, wherein at least one of the coating applied to the interior of said polymer wall of the container and the coating applied to the exterior of said polymer wall of the container has a thickness of 100 nm to 30 µm.

7. The container of claim 1, wherein the container is a wine bottle having volume of 0.187 to 3 liters.

8. The container of claim 7, wherein the wine bottle has volume of 750 ml.

9. The container of claim 7, wherein the container is a wine bottle having a body that terminates in a base, a shoulder, and a neck, the shoulder forming a tapered region between the neck and the body, and the neck terminating in a finish wherein the wine bottle has an overall height of approximately 290.53 mm, an overall width at the body of approximately 89.4 mm.

10. The container of claim 9, wherein the body is approximately 130.5 mm tall, the neck is approximately 37.23 mm tall, and the shoulder has an inside radius of approximately 101 mm at a junction with the body, and an outside radius of approximately 200 mm tapering towards the neck.

11. The container of claim 1, wherein the container is a wine bottle having a body that terminates in a base, a shoulder, and a neck, the shoulder forming a tapered region between the neck and the body, and the neck terminating in a finish, wherein the polymer wall of the neck has a thickness greater than a thickness of the polymer wall of the body.

12. The container of claim 11, wherein the polymer wall of the neck has a thickness of approximately 2.5-3 mm.

13. The container of claim 11, wherein the polymer wall of the body has a thickness of approximately 1.5-2 mm.

14. The container of claim 1, wherein a thickness of the polymer wall varies at different portions of the container.

15. The container of claim 1, wherein said polymer wall is fashioned from one or more of: polycarbonate (PC), polysulfone (PSU), polypropylene (PP), polyethylene terephthalate (PET), or glycol-modified polyethylene terephthalate (PETG).

* * * * *